United States Patent
Chen et al.

(10) Patent No.: US 7,438,809 B2
(45) Date of Patent: Oct. 21, 2008

(54) SINGLE-CELL MECHANICAL FLOTATION SYSTEM

(75) Inventors: James C. T. Chen, Houston, TX (US); Shaya Movafaghian, Houston, TX (US)

(73) Assignee: Petreco International Inc., Houston, TX (US)

( * ) Notice: Subject to any disclaimer, the term of this patent is extended or adjusted under 35 U.S.C. 154(b) by 505 days.

(21) Appl. No.: 11/049,015

(22) Filed: Feb. 2, 2005

(65) Prior Publication Data
US 2006/0169644 A1 Aug. 3, 2006

(51) Int. Cl.
*C02F 1/24* (2006.01)
(52) U.S. Cl. .............. 210/221.1; 210/221.2; 210/512.1; 210/512.3
(58) Field of Classification Search .............. 210/221.1, 210/221.2, 512.1, 512.3
See application file for complete search history.

(56) References Cited

U.S. PATENT DOCUMENTS

| | | | |
|---|---|---|---|
| 2,294,827 A | | 9/1942 | Booth |
| 2,436,375 A | * | 2/1948 | Booth et al. ............... 210/703 |
| 2,578,040 A | * | 12/1951 | Booth et al. ............... 508/111 |
| 2,718,275 A | | 9/1955 | Banks |
| 2,766,203 A | | 10/1956 | Brown et al. |
| 3,192,155 A | * | 6/1965 | Bready et al. ............... 210/705 |
| 3,246,763 A | * | 4/1966 | Baum ..................... 210/221.2 |
| 3,342,331 A | * | 9/1967 | Maxwell .................... 209/170 |
| 3,358,422 A | | 12/1967 | Van Der Schee |
| 3,411,270 A | | 11/1968 | Cornelius et al. |
| 3,491,880 A | * | 1/1970 | Reck .......................... 209/164 |
| 3,647,069 A | | 3/1972 | Bailey |
| 3,701,421 A | * | 10/1972 | Maxwell .................... 209/164 |
| 3,802,569 A | * | 4/1974 | Nagahama ................. 210/219 |
| 3,815,331 A | | 6/1974 | Hondermark |

(Continued)

FOREIGN PATENT DOCUMENTS

GB 2114469 A * 8/1983

(Continued)

OTHER PUBLICATIONS

S. Movafaghian, et al., "Pilot Testing of a New Generation of Induced Gas Flotation Equipment," SPE Production & Facilities, Feb. 2004, pp. 9-13.

(Continued)

*Primary Examiner*—Thomas M Lithgow
(74) *Attorney, Agent, or Firm*—Madan Mossman & Sriram PC

(57) ABSTRACT

A mechanical flotation system having only one cell may be nearly as efficient as one having two or more cells, yet provide an apparatus with a considerably smaller footprint, significantly reduced capital and operating costs, as well as be resistant to floating oil recovery platform wave effects. The single-cell mechanical flotation system may have one skim collection channel that at least partially surrounds a single gas ingestion and mixing mechanism. At least one baffle may direct suspended matter or floc toward the skim collection which may be circular. The gas layer over the liquid is not vented for the purpose of gasification. The vessel may be a cylindrical pressure vessel oriented vertically, and optionally the inlet may be tangential to the periphery of the vessel to impart liquid rotation inside the vessel when liquid is introduced.

14 Claims, 4 Drawing Sheets

U.S. PATENT DOCUMENTS

| | | | |
|---|---|---|---|
| 3,972,815 A * | 8/1976 | O'Cheskey et al. | 210/219 |
| 3,993,563 A | 11/1976 | Degner | |
| 4,097,249 A | 6/1978 | Phillips et al. | |
| 4,136,747 A | 1/1979 | Mallory et al. | |
| 4,564,457 A * | 1/1986 | Cairo et al. | 210/704 |
| 4,612,021 A | 9/1986 | Bland et al. | |
| 4,715,869 A | 12/1987 | Ramshaw | |
| 4,737,272 A * | 4/1988 | Szatkowski et al. | 209/164 |
| 4,737,288 A | 4/1988 | Melis et al. | |
| 4,782,789 A * | 11/1988 | Canzoneri | 210/703 |
| 4,986,903 A | 1/1991 | Canzoneri et al. | |
| 4,990,246 A | 2/1991 | Blazejczak et al. | |
| 5,011,597 A | 4/1991 | Canzoneri et al. | |
| 5,044,761 A | 9/1991 | Yuhki et al. | |
| 5,080,780 A | 1/1992 | Canzoneri et al. | |
| 5,348,648 A | 9/1994 | Hamdan | |
| 5,500,117 A * | 3/1996 | Hamdan | 210/512.1 |
| 5,585,005 A | 12/1996 | Smith et al. | |
| 5,707,530 A * | 1/1998 | Broussard, Jr. | 210/703 |
| 5,766,321 A | 6/1998 | Ishihara et al. | |
| 6,095,336 A * | 8/2000 | Redden et al. | 209/169 |
| 6,227,374 B1 * | 5/2001 | Britz et al. | 209/164 |
| 6,660,067 B2 | 12/2003 | Stacy et al. | |
| 6,926,154 B2 * | 8/2005 | Bourke et al. | 209/168 |
| 2003/0213735 A1 * | 11/2003 | Staoy et al. | 210/221.1 |
| 2006/0169644 A1 * | 8/2006 | Chen et al. | 210/703 |

FOREIGN PATENT DOCUMENTS

WO          02/49768     *  6/2002

OTHER PUBLICATIONS

Patent Abstracts of Japan, vol. 018, No. 233 (C-1195), Apr. 18, 1994 & JP 06 023349A (Japan Organo Co. Ltd.), Feb. 1, 1994, Abstract.

* cited by examiner

SINGLE-CELL MECHANICAL FLOTATION SYSTEM

FIELD OF THE INVENTION

The present invention relates to methods and apparatus for removing suspended matter from a liquid in general and for removing oil and other suspended particulate contaminants from the water stream in the oil field in particular, and in one non-limiting embodiment, the invention relates to removing suspended matter from a liquid on offshore platforms where small footprint of processing apparatus is of important economical advantage both in capital and operating expenditure.

BACKGROUND OF THE INVENTION

Gas flotation is one of the most efficient and widely accepted methods used in variety of industries where removal of solid or immiscible liquid phases is of interest. In particular, in the petroleum industry, the ever-increasing volume of associated water produced from the hydrocarbon reservoirs as a side product has become a major issue to be addressed by the producers. Environmental awareness and regulations are increasingly challenging the producers to achieve a high degree of purification in the treated water streams prior to discharge or re-injection. Gas flotation has proven one of the most efficient and economical polishing processes compared to other methods and available technologies. Simultaneously, the economical penalty for additional water treatment capacity and footprint of apparatus are major factors in budgeting and decision making for the producers.

Previous endeavors include apparatus with at least two active capacities or gasification chambers with a common skimmer at the center of a horizontal tank, such as those taught in U.S. Pat. Nos. 4,990,246 and 5,348,648. Gasification is applied by means of at least two rotor assemblies located at the center of each gasification chamber. The common skimmer consists of a movable part having a downwardly opening annulus extending around a fixed part. The floating skimmer assembly must be of an exact weight, hence multiple adjustments by means of adding and removing of counterweights to the assembly is required. The assembly must be designed to specific needs of each application and must be adjusted for any variations to the froth rate, feed rate and other variables. This vulnerability to process variations is a major concern to the operation of these systems in continuous operation as constant monitoring and maintenance is required due to the unpredictable nature of production operation.

Another known flotation apparatus is disclosed in the U.S. Pat. No. 5,080,780 for a vertical single chamber unit. The system includes a vertical tank with inlet and outlet connections. The feed enters the tank from the bottom through an inlet distributor and moves upwardly and over a circular baffle arrangement to the outlet chamber. A separate gasification system is installed on the outside of the tank, including gas and liquid transfer lines, at least one pump and one vacuum pump. The pump suction is flooded by the treated liquid leaving the tank. This liquid is discharged from the pump and into the vacuum pump at specific rate and pressure dictated by the vacuum pump design. The vapor connection of the vacuum pump is piped to the top portion of the tank where the overhead vapors are drawn into the vacuum pump and mix with the motive fluid. This mixture is then released into the tank from the bottom and gas bubbles generated in this recycle line provide the flotation effect within the tank. Even though practical, this system suffers from inefficient distribution of gas, reduced capacity due to an additional recycle stream and additional space and attention required for the auxiliary gasification system.

U.S. Patent Application No. 2003/0213735 A1 to Stacy, et al. describes an improved design for a gas flotation apparatus with rotors as the means for gasification. The apparatus includes two gasification chambers, each equipped with a dedicated rotor assembly, a common skimming trough in the middle of the horizontal tank and a third discharge compartment. This apparatus has a smaller footprint and lower power consumption for treatment of produced water due to a reduced number of gasification chambers and rotor assemblies from a typical four-cell unit and maintains relatively high contaminant removal efficiency. Froth can be collected in multiple locations in each chamber. The primary means of skim collection is the common reservoir integral with a partition between the two gasification chambers. Treated liquid leaves the second gasification chamber through a control valve and into the discharge chamber where additional skimming and level control mechanisms are required for final discharge of the treated liquid.

Even though these discussed systems offer improvements to the traditional mechanical or hydraulic gasification and have proven viable alternatives to such units, where a smaller footprint is desired such as on an offshore platform where space is at a premium, there still remain problems and areas of improvement driven by economic and performance criteria.

It would be desirable if an apparatus could be devised to overcome some of the problems in the conventional systems for removing suspended matter from a liquid, particularly in systems used on floating offshore hydrocarbon recovery platforms where the action of the waves upon the apparatus tends to cause the suspended matter to contaminate the recovered water. Further, it would be additionally desirable to reduce the footprint of separation systems for even stationary offshore platforms.

SUMMARY OF THE INVENTION

Accordingly, it is an object of the present invention to provide an apparatus for removing suspended matter from a liquid, which apparatus is particularly suited to be used on floating and stationary offshore hydrocarbon recovery platforms.

It is another object of the present invention to provide a single-cell, mechanical, cylindrical gas flotation system having a reduced footprint, reduced power requirements and reduced capital and operating costs that overcomes the adverse wave effects on floating platforms.

In carrying out these and other objects of the invention, in one non-limiting embodiment, there is provided an improved apparatus for separating an immiscible phase from another liquid phase by means of creating an abundance of gas bubbles by rotor action in the liquid, and bringing the bubbles in contact with immiscible contaminants, whether in solid or liquid state, and removing the contaminants by promoting attachment of bubbles and contaminants, thus increasing the buoyancy of the resulting floc and floating the floc to the interface to form a froth and removing the froth by means of hydraulic drainage to a collection reservoir.

In a refined, non-restrictive embodiment, there is provided a holding tank that contains only one gasification chamber, hence significantly reducing the size, weight and power consumption of the apparatus compared to prior devices. In another non-limiting refinement, the self induction mechanism of internal gas circulation may be preferred compared to external recycle vacuum pump systems with complicated pump and piping assemblies or external gas sources which require continuous gas consumption and purge from the apparatus. In another non-restrictive version, the operating pressure of the apparatus may be adjusted to process requirements, as contrasted with external recycle vacuum pumps which are limited to a specific discharge pressure by design. In another non-limiting refinement, a single cell unit with a self-induced mechanical rotor has proven much more efficient as compared with other available single-cell flotation technologies utilizing external vacuum pumps, sparging gas systems and all variations thereof. In another non-restrictive embodiment, the design of the current apparatus has benefited from an abundance of field trial data and reliable and proven theoretical methodology developed for it.

In a different, non-limiting form there is provided an apparatus for removing suspended matter from a liquid where the apparatus includes a vessel for receiving a flow of liquid having suspended matter therein, an inlet to introduce the flow of liquid into the vessel, and an outlet for removing clarified liquid from the vessel. There is also included a gas layer in the upper portion of the vessel and a mechanism (e.g. rotor assembly) in the vessel for ingesting and mixing gas into the liquid of the vessel for creating a turbulent area and for attracting the suspended matter and for carrying the suspended matter to an upper portion of the vessel, where the interface of the gas layer and liquid is a liquid level. There is additionally included a skim collection channel at least partially surrounding the mechanism for collecting suspended matter in the upper portion of the vessel and removing the suspended matter by a drain. In another non-restrictive embodiment the invention concerns methods of using apparatus of this type.

It will be appreciated that the Figures are schematic illustrations that are not necessarily to scale or proportion in part to further illustrate the important parts of the invention.

DETAILED DESCRIPTION OF THE INVENTION

It has been discovered that an efficient apparatus for removing suspended matter from a liquid may have only one gasification chamber, i.e. one chamber for mixing a gas with the liquid to separate suspended matter therefrom. In one non-limiting embodiment, the influent may be water contaminated with oil and other suspended particulates. It is to be understood that the present invention has utility in numerous applications in which it is desirable to separate suspended matter and/or oil from a liquid, and that the suspended matter, the liquid, or both may be the desired product of the process. Thus, although the invention is described herein in terms of removing oil and oily solids from water, the apparatus and methods may be applied to other liquid/suspended matter separation processes.

Figure 1:
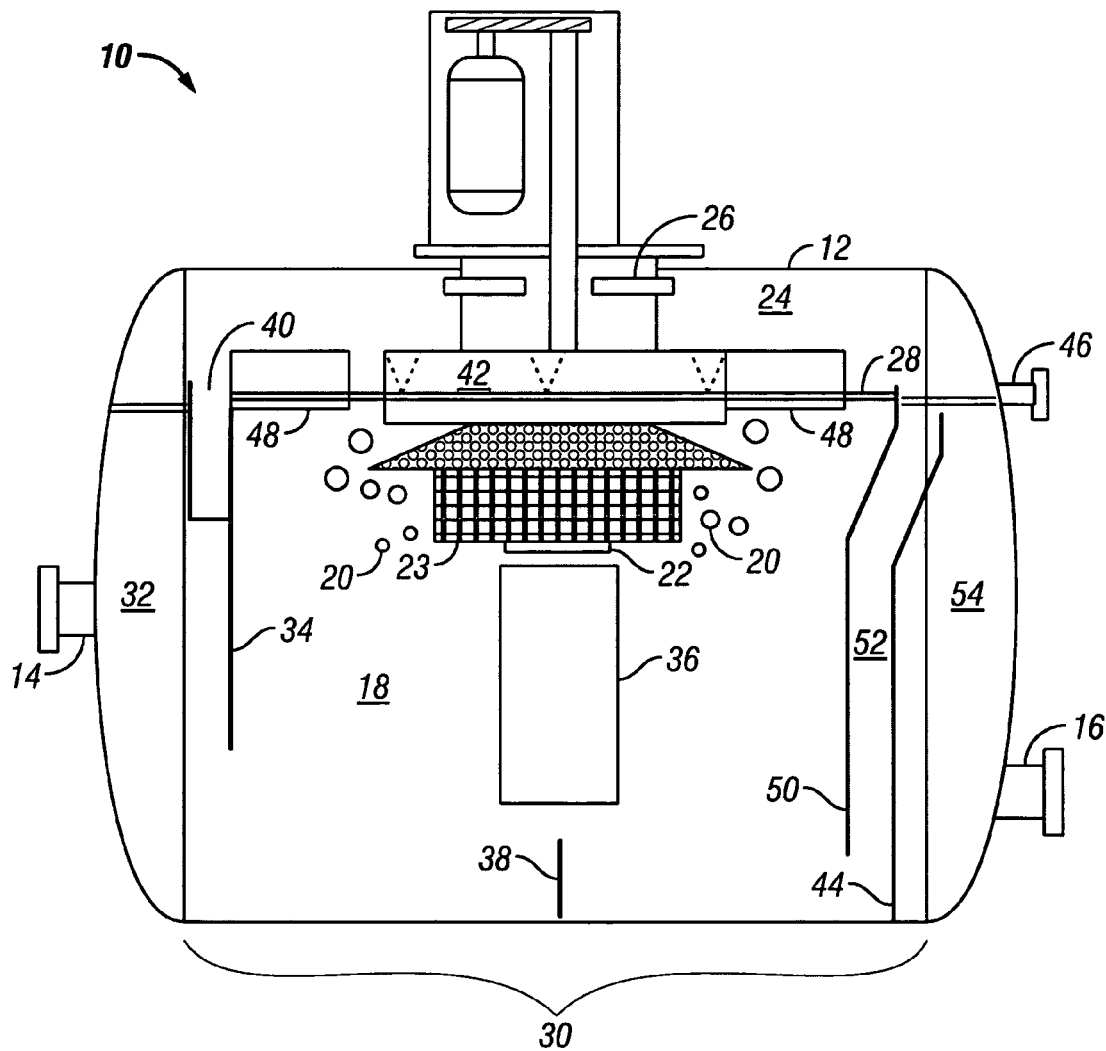
FIG. 1 is a schematic, cross-sectional illustration of one embodiment of the single-cell mechanical flotation system of the invention where the vessel is oriented horizontally.

It will be appreciated that throughout the specification and claims, reference to the singular includes the plural, and reference to the plural includes the singular, unless expressly noted otherwise. Referring to FIG. 1, the present apparatus or system 10 consists of a cylindrical vessel 12 capable of withholding high internal pressure, with at least one inlet 14 and at least one outlet 16 to accommodate the flow of contaminated liquid 18 into the apparatus 10 and flow of treated effluent out of the apparatus 10, respectively. In one non-limiting embodiment vessel 12 has a continuous cylindrical sidewall and is capable of withstanding substantial internal pressures as may be encountered when processing produced water from an oil well. The vessel 12, is entirely or at least partly utilized to bring into contact the incoming liquid 18 with small gas bubbles 20 generated by a rotating action of a rotor or depurator or other mixing device 22, submerged in the liquid 18. Gas ingesting and mixing mechanisms 22, in one non-limiting embodiment, are preferably the devices of U.S. Pat. No. 3,993,563, incorporated by reference herein, although it will be appreciated that other devices, including but not limited to, simple aerators, may be used. The rotor assembly 22 in one non-limiting embodiment as a minimum can comprise a stand pipe, disperser 23, hood, rotor and a vertical shaft connected to a motor drive assembly.

The purpose of the rotor assembly 22 is to induce gas from a gas layer in the upper or top portion 24 of the vessel 12 into the liquid. The gas is circulated from the vapor or gas area of the vessel 12 into the liquid 18 through a single or a plurality of openings or draft tubes 26. In doing so, the volume of the gas in circulation is dispersed into plurality of bubbles 20 which create a large surface area by rotor 22 action. The gas bubbles 20 travel towards the interface 28 due to their buoyancy and provide the opportunity of contact with the suspended contaminant in the liquid 18. These contaminants then will be carried with the gas bubbles 20 to the surface 28, where they form a distinguishable thin layer at the surface of the liquid 18. The gas, after breaking through the liquid surface, then returns to the vapor portion of the vessel 12 and continues to recycle within the capacity of the vessel 12, without being consumed.

In one non-restrictive embodiment, the vessel 12 can be a horizontally-oriented cylinder, with an inlet chamber 32, gasification chamber 30 and outlet chamber 54 as specifically exemplified in FIG. 1. The contaminated liquid enters the tank into the inlet chamber 32. In this embodiment, the capacity of inlet chamber 32 allows for partial separation of larger contaminants and liquid continues to flow downward under the partition 34 into gasification chamber 30. The capacity within the gasification chamber 30 is mixed with the induced gas in a multitude of passes through the rotor 22 and disperser 23 assemblies, depending on the size and rotational speed of the rotor 22. A hollow draft tube 36 can provide a lifting action for the liquid 18 at the bottom of the vessel 12 ensuring entire liquid capacity is traveling towards the rotor 22. Inclusion of the water draft tube 36 facilitates capacity variations within the same geometry because all water that enters the rotor assembly is directed to the rotor suction from the bottom of vessel 12, reducing fluid bypass and short circuiting of the fluid around the turbulent areas. A single or multiple short baffles 38 might be installed at the bottom of the vessel 12 to prevent short circuiting of the contaminated liquid 18.

One or more collection reservoirs for contaminants can be provided. In one non-restrictive embodiment, the contaminant reservoir 40 can be installed at the top of the inlet and outlet partition 34, 44 at each end of the vessel 12. In another embodiment, a contaminant reservoir or skim collection channel 42 can be located at or near the center of the vessel 12 where the liquid surface 28 motion due to oil platform's movement is at minimum. Skim collection channel 42 may at least partially surround the mechanism 22 for ingesting and mixing gas that creates a turbulent area in liquid 18, and which attracts the suspended matter or floc and carries it to the upper portion of vessel 12. "At least partially surround" is defined to mean a single channel that covers at least two sides of the mechanism 22. Skim collection channel 42 may be substantially annular or circular or semi-circular, or at least a closed loop or closed circuit, and may or may not be concentric with the depurator or mechanism 22. By "substantially annular" is meant roughly circular and includes oval shapes. The skim collection channel 42 may also substantially completely surround mechanism 22, by which is meant surround at least 270° of the circumference around mechanism 22. The advantage of this embodiment is to minimize the volume of contaminated liquid being skimmed off from the interface 28 and drain through opening 46. Minimizing skim volume is very important as it reduces treatment capacity and thereby the size of downstream facilities.

Skim collection channel 42 may be vertically adjustable to meet with the liquid level or interface 28, and/or alternatively, the liquid level or interface 28 may be adjustable or regulated to meet with the skim collection channel 42. These heights may be regulated by a control mechanism, such as a programmable logic controller (PLC, not shown) which may work in conjunction with one or more level transmitters and one or more level control valves (not shown). Further details on induced static flotation (ISF) collection channels may be seen in U.S. Pat. No. 4,782,789, incorporated by reference herein. Convergence baffles 48 act as guides to direct or herd the froth towards the collection reservoirs 40, 42.

The liquid 18 leaves the gasification chamber 30 passing underneath the partition 50 through the channel 52 in an upward direction and over the partition 44 into the capacity or outlet chamber 54 and out from outlet 16. In one embodiment, partition 50 may be identical to partition 34 or also be provided with a capacity to collect contaminants in the form of froth similar to contaminant reservoir 40. The upward motion of the liquid prior to its entrance into the outlet chamber 54, is of advantage to this invention, as upward movement of the liquid carries finer contaminants or any gas bubbles 20 escaping from the gasification chamber 30 to the liquid interface 28, providing additional contaminant cleansing action prior to discharge.

Figure 2:
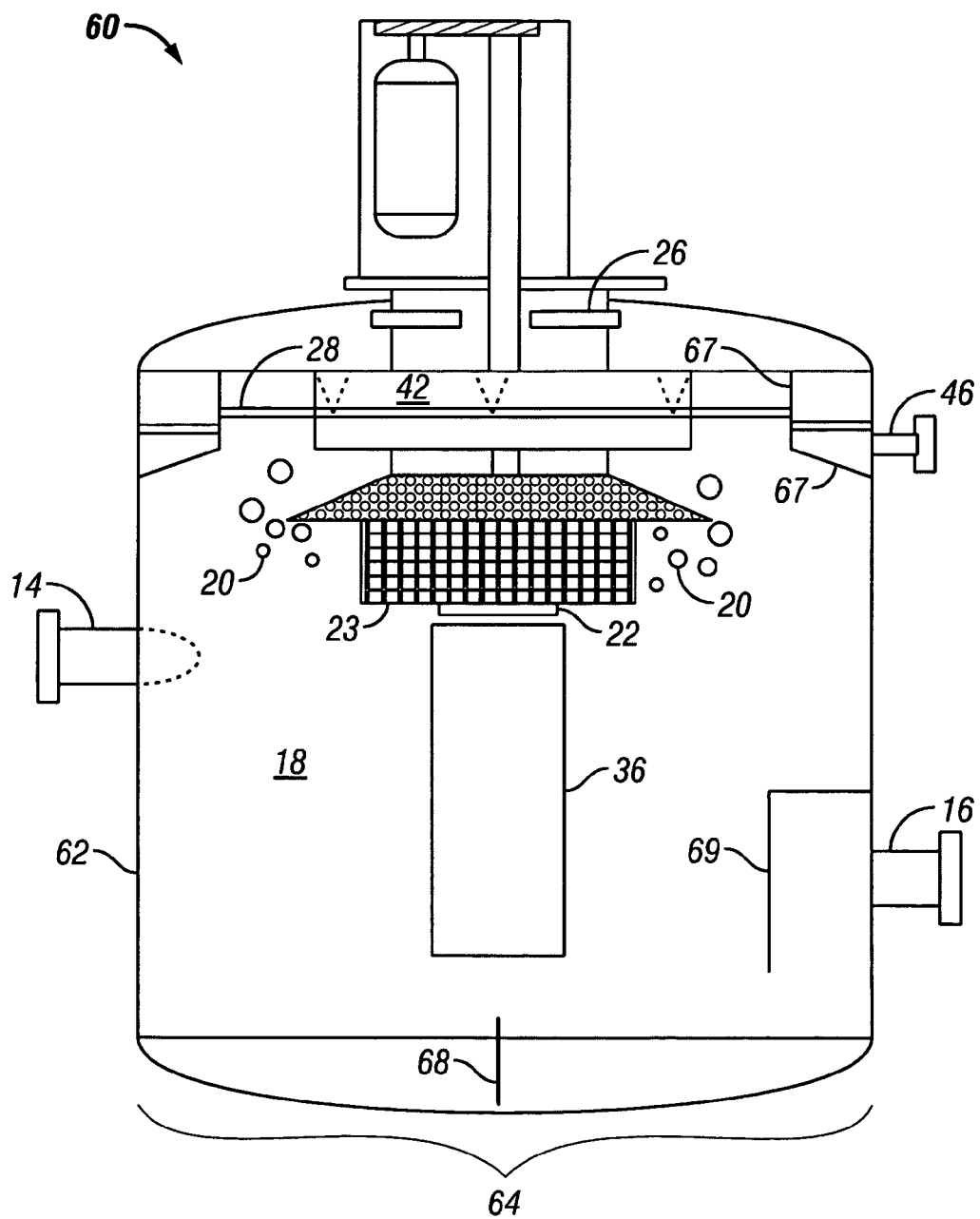
FIG. 2 is a schematic, cross-sectional illustration of another embodiment of the single-cell mechanical flotation system herein where the vessel is oriented vertically.

In another non-limiting embodiment, the inventive apparatus or system 60 may include a vertical cylinder vessel 62 with rotor assembly 22 installed on the top thereof as shown in FIG. 2. Like reference numerals are used to refer to like elements. By "vertically oriented" is meant that the axis of the cylindrical vessel 62 is perpendicular or normal to the ground or the oil recovery platform on which it is mounted. The contaminated liquid 18 enters the capacity or gasification chamber 64 through at least one inlet opening 14. In this embodiment, the entire capacity of the apparatus may be utilized for gasification or as a gasification chamber 64. In one embodiment, the inlet opening 14 can be placed tangential to the periphery of the vessel 62, in such way that the inlet velocity creates a moderate rotation in the liquid body inside the vessel 62. When the direction of this rotation is in alignment with the direction of rotor 22 rotation, the induced centrifugal movement causes contaminants of larger specific gravity differential to be displaced towards the center of the vessel 62. This effect provides a moderate horizontal sweep in addition to vertical sweep as described in the description of prior embodiment. The vertical sweep previously described applies to this embodiment as well. This additional sweep in one occasion can be utilized to minimize the residence time in the gasification chamber 64 by reducing the volume, without significant reduction in contaminant removal efficiency hence, resulting in smaller footprint. In another occasion, this additional sweep can be utilized to improve the contaminant removal efficiency for the same gasification capacity. The froth forms at the liquid interface 28 and is removed through skim collection channel 42 and opening 46. In another embodiment, a second, at least partially surrounding skim collection channel 66 can be located off-center and made by partition 67. Again, a hollow tube 36 can be utilized to lift the liquid from the bottom of the vessel 62 towards the rotor 22 to ensure multiple passes of gasification. Series of baffles 68 and 69 can be utilized to control or enhance the hydrodynamics within the gasification chamber 64. The gas remains in circulation throughout the gasification chamber 64 and is not consumed. In one embodiment of the invention, the vapor space in the upper portion of vessels 12 and 62 is sealed off, that is, it is not open to the atmosphere.

Figure 3A:
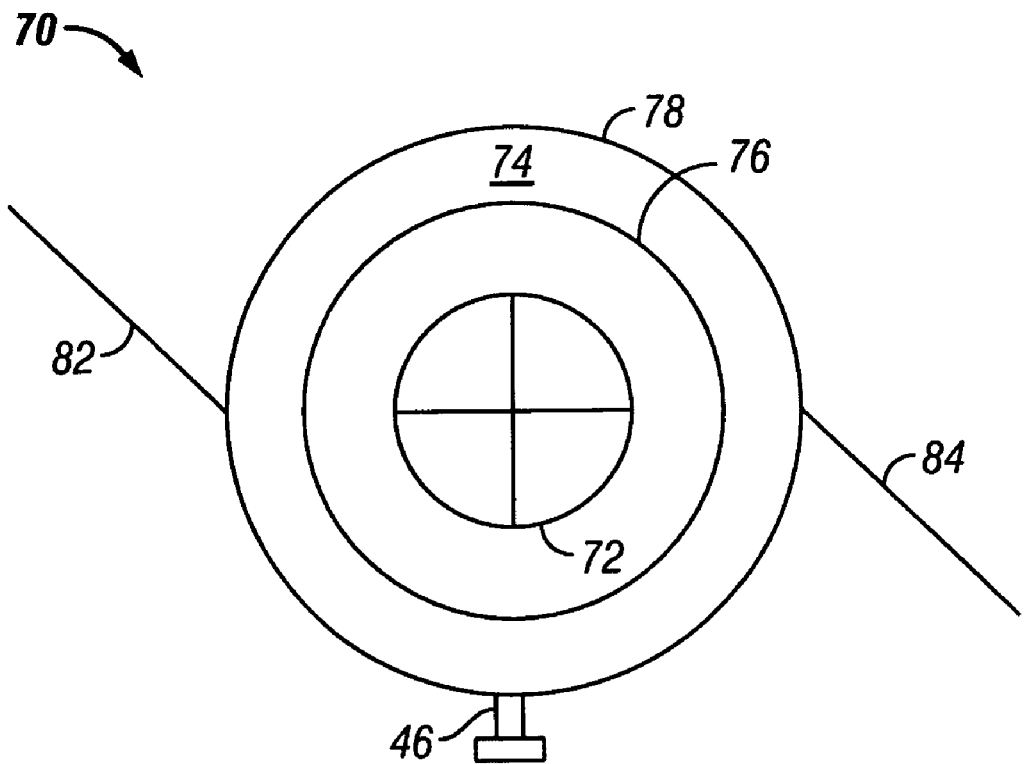
FIG. 3A is a schematic, top view of a circular skim collection channel.
Figure 3B:
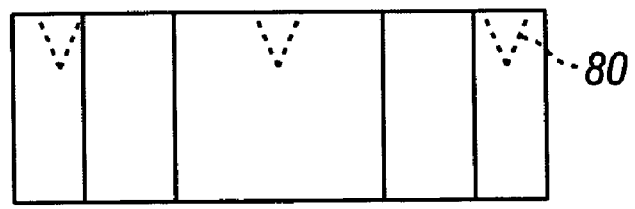
FIG. 3B is a schematic, side view of the circular skim collection channel of FIG. 3A.

Another innovation herein pertains to the method of froth collection. In some prior apparatus, the froth is removed by means of partitioning a small length of the tank or vessel on each end of the gasification chamber or between the two consecutive chambers. In contrast, included herein is a new design for the froth collection reservoir or channel. Shown in FIGS. 3A and 3B is one non-limiting embodiment of such design which demonstrates a collection channel 70 located peripherally or near to a stand pipe 72, creating an enclosed capacity or reservoir 74 between two concentric partitions, inner partition 76 and outer partition 78. The outer and inner rims 76 and 78 of the reservoir may be equipped with plurality of v-notches or other shape contours 80 through which the suspended matter or contaminants pass. Convergence baffles 82 and 84 may be provided and installed at an angle on the outer periphery or in some other fashion to the vessel 12/62 or vessel internals, to guide the froth towards the collection channel 70 by harnessing the rotational motion of the fluid, exerted by the rotor 22. The collected froth then, is routed into the drain 46 or plurality thereof, and leaves through the vessel wall (not shown in FIG. 3).

Figure 4A:
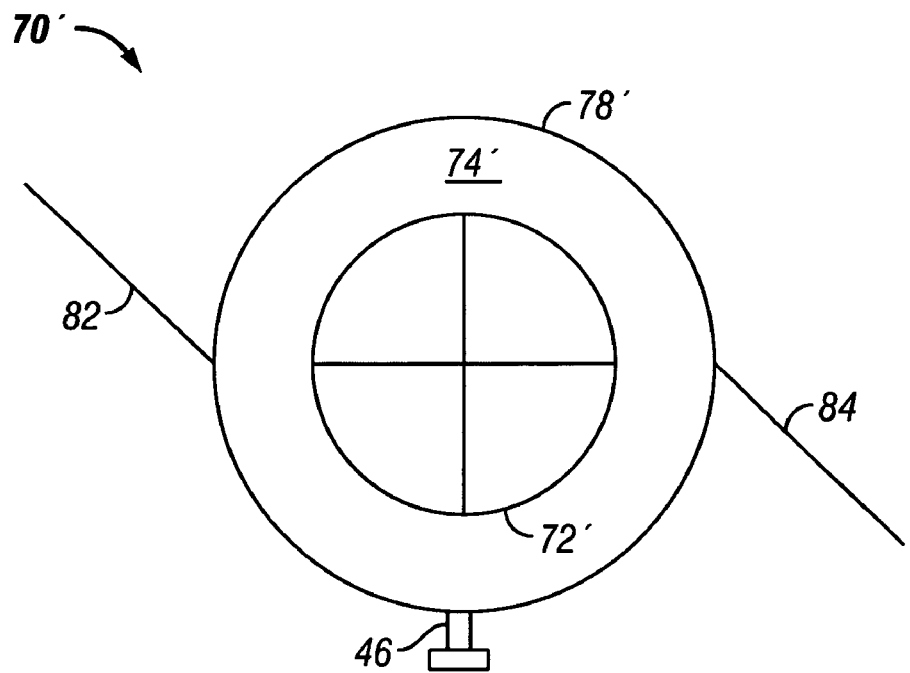
FIG. 4A is a schematic, top view of an alternate, circular skim collection channel.
Figure 4B:
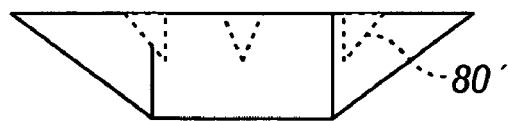
FIG. 4B is a schematic, side view of the circular skim collection channel of FIG. 4A.
Figure 4C:
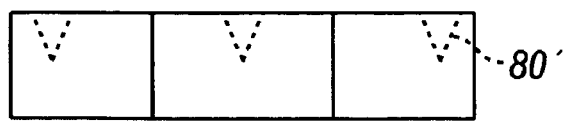
FIG. 4C is an alternate, schematic, side view of the circular skim collection channel of FIG. 4A.

FIGS. 4A, 4B, and 4C present another non-restrictive embodiment of the froth collection channel 70', which includes either a cylindrical (FIG. 4C) or frustoconical (FIG. 4B) partition 78' on the outside and the standpipe 72' on the inside, creating the capacity 74'. The periphery of the outer rim 78' can be equipped with plurality of v-notches or other shape contours 80'. Similarly, convergence baffles 82 and 84 can be provided as guides for the froth to the collection reservoir or channel 70'. Froth then leaves the tank through opening or drain 46.

Another important feature of the invention is intermittent skimming of the suspended matter by raising the skim level (e.g. froth level or fluid level 28) in order to remove the suspended matter or skim oil for high pitch and roll conditions on a floating production platform. It will be appreciated that on a floating offshore hydrocarbon recovery platform (or any other environment subject to excessive motion) it is possible for excessive wave action, such as during storms, hurricanes and other conditions that the platform may pitch and/or roll excessively. By "excessively" is meant to the detriment of the present method of clarifying water. That is, during consequent pitching and/or rolling of system 10/60, some clarified water would be undesirably collected by skim channel 42 caused by froth levels or fluid levels 28 splashing over or sloshing over excessively into these channels.

This waste of clarified water may be minimized by controlling froth level or fluid level 28. The control of the height of this level may be through a PLC via a level control valve (LCV, not shown) in response to pitch and/or roll data collected by pitch and roll sensor (not shown). It will be appreciated that the exact nature of pitch and roll sensor is not critical and may be achieved by various angle or pitch sensors conventionally available. It is not necessary that the pitch and roll sensor be a single device, but may be two or more devices.

An optional chemical feed unit (not shown), which is a standard feed unit for dispensing a metered amount of a flocculant chemical, using a polymer or a demulsifier, into fluid 18, to initially treat the influent for achieving optimum separation of contaminants from the water can be provided.

Although not shown, valves may be provided for blowdown of sludge that collects in the bottom of vessel 12. Also not shown are optional gauges to monitor the pressure of the effluent and the flow of gas, and a system for replacing or replenishing gas, as necessary.

In the method of the invention, using the FIG. 1 embodiment except as noted, a continuous flow of liquid 18 having suspended matter mixed therewith is introduced into inlet chamber 32 (if present, otherwise, directly into gasification chamber 64 in the FIG. 2 embodiment) through inlet 14. Some separation of the suspended matter occurs in inlet chamber 32 by floating to the upper portion of inlet chamber 32. This froth or suspended matter is collected in containment reservoir 40 a drain opening (not shown, but similar to 46) to a consolidating collection channel away from vessel 12. As noted, in one embodiment of the invention, froth level 28 may be controlled. That is, during periods of undesirable or detrimental pitch or roll, froth level 28 may be lowered below skim collection chamber 42 and/or 40 then ramped up or intermittently raised during or for collection. Controls for changing level 28 are not shown, but would be known to those skilled in the art.

Fluid 18, still containing considerable suspended matter, underflows partition 34 into gasification chamber 30 (gasification chamber 64 in FIG. 2) where a flow of gas is introduced into the liquid 18 by gas ingesting and mixing mechanism 22, creating a turbulent area in the entirety of chambers 30 or 64, and allowing the gas to attract the suspended matter and carry it to the upper portion of vessel 12 where it floats at level 28. This suspended matter is collected in skim collection channel 42 that at least partially surrounds the mixing mechanism 22 (and also reservoir 40 and channel 66, if present). The skim collection channel 42 (and channel 66, if present) may alternatively completely surround mixing mechanism 22, as in the embodiments shown in FIGS. 3 and 4. The suspended matter is delivered through drain opening 46. At least one baffle 82 or 84 near the skim collection channel 42 dampens the motion of the fluid 18 that occurs when vessel is rocked or moved in response to waves hitting the hydrocarbon production platform.

Fluid 18, largely free of suspended matter, next underflows partition 50 (or as in FIG. 2 directly exits vessel 12 through outlet 16) and flows through channel 52 into outlet chamber 54. Passage of the fluid 18 from outlet chamber 54 through outlet 16 may optionally be regulated by a level control valve (not shown) in response to signals from a PLC (not shown) according to a software program therein using information from a level transmitter according to techniques and apparatus known to those skilled in the art.

To summarize, advantages of the invention include, but are not necessarily limited to, a decreased "footprint" (decreased space requirements), reduced power requirements, reduced capital and operating costs, and improved tolerance to platform wave motion effects, as compared with conventional mechanical flotation systems, such as four- or two-cell systems. These advantages are achieved through a single-cell, mechanical, cylindrical gas flotation system with a baffling and floc collection design to minimize surface wave action. Level control in some embodiments will ensure proper rotor submergence of the gas ingesting mechanism and provide a stable level at the froth surface to allow controlled skimming and enhanced performance. Use of draft tubes in connection with the gas ingesting and mixing mechanisms minimize short-circuiting over a wide range of capacities.

Field tests and results of actual installations for two and four gasification-cell self-induced gas floatation apparatus have proven high contaminant removal efficiency with reduced footprint. Based on these results, the current invention is expected to provide similar performance up to 85% or better removal of suspended matter, with significant economical advantages including, but not necessarily limited to, the apparatus footprint, power consumption and most importantly flotation gas consumption.

In the present invention, using only one gasification chamber or cell and a residence time in each chamber of about 2.0 to 2.5 minutes, the efficiency achieved of about 70-75% or more is comparable to that obtained using a dual-cell design, but at much less power utilization than other single cell systems. That is, with the inventive apparatus, while efficiency is slightly reduced, the horsepower requirements are much less that of a conventional system (since only one gas ingesting/mixing mechanism is required instead of two or four), and the "footprint" or area consumed by the apparatus is reduced by nearly half—an important consideration on an offshore oil platform where space is at a premium.

In the foregoing specification, the invention has been described with reference to specific embodiments thereof, and has been demonstrated as effective in providing a mechanical flotation system for removing suspended matter from liquids. However, it will be evident that various modifications and changes can be made thereto without departing from the broader spirit or scope of the invention as set forth in the appended claims. Accordingly, the specification is to be regarded in an illustrative rather than a restrictive sense. For example, the distances between the partitions and the volumes of the various chambers may be changed or optimized from that illustrated and described, and even though they were not specifically identified or tried in a particular apparatus, would be anticipated to be within the scope of this invention. Similarly, gas ingestion and mixing mechanisms, and level transmitting and control devices different from those illustrated and described herein would be expected to find utility and be encompassed by the appended claims. Further, liquid level control and skimming and collecting patterns or protocols different from those explicitly described here may nevertheless fall within the scope of the invention.

We claim:

1. An apparatus for removing suspended matter from a liquid, comprising:
   a) a vessel comprising an inlet to receive a flow of liquid having suspended matter therein and an outlet for removing clarified liquid from the vessel;
   b) a gas layer in the upper portion of the vessel;
   c) a mechanism in the vessel for ingesting and mixing gas into the liquid for creating a turbulent area and for attracting the suspended matter and for carrying the suspended matter to an upper portion of the vessel, the interface of the gas layer and liquid being a liquid level;

d) a skim collection channel at least partially surrounding the mechanism for collecting suspended matter in the upper portion of the vessel, the skim collection channel being equipped with a plurality of v-notches, and removing the suspended matter by a drain.

2. The apparatus of claim 1 where the gas layer is not open to the atmosphere.

3. The apparatus of claim 1 where the skim collection channel is substantially annular and substantially completely surrounds the mechanism.

4. The apparatus of claim 3 where the skim collection channel is circular and concentric with the mechanism.

5. The apparatus of claim 1 further comprising:
   g) at least one baffle near the skim collection channel to direct the suspended matter to the skim collection channel.

6. The apparatus of claim 1 where the vessel is a cylindrical pressure vessel oriented vertically.

7. The apparatus of claim 6 where the vessel has a periphery and the inlet is angled tangentially to the periphery to create liquid rotation inside the vessel.

8. The apparatus of claim 1 where the vessel is a cylindrical pressure vessel oriented horizontally, and the vessel further comprises an inlet chamber, one gasification chamber and an outlet chamber, where the inlet chamber is between the inlet and the gasification chamber and where the outlet chamber is between the gasification chamber and the outlet, and the inlet chamber, gasification chamber and outlet chamber are divided by partitions and the liquid flows between chambers under the partitions.

9. An apparatus for removing suspended matter from a liquid, comprising:
   a) a vessel comprising an inlet to receive a flow of liquid having suspended matter therein and an outlet for removing clarified liquid from the vessel;
   b) a plurality of partitions sequentially dividing the vessel into an inlet chamber, a single gasification chamber, and an outlet chamber, each adjacent chamber fluidly communicating with one another;
   c) a gas layer in the upper portion of the vessel;
   d) a mechanism for ingesting and mixing gas into the liquid of the gasification chamber for creating a turbulent area and for attracting the suspended matter and for carrying the suspended matter to an upper portion of the vessel, the interface of the gas and liquid being a liquid level; and
   e) a skim collection channel at least partially surrounding the mechanism for collecting suspended matter in the upper portion of the vessel, the skim collection channel being equipped with a plurality of v-notches, and removing the suspended matter by a drain.

10. The apparatus of claim 9 where the gas layer is not open to the atmosphere.

11. The apparatus of claim 9 where the skim collection channel is substantially annular and substantially completely surrounds the mechanism.

12. The apparatus of claim 11 where the skim collection channel is circular and concentric with the mechanism.

13. The apparatus of claim 9 further comprising:
   h) at least one baffle near the skim collection channel to direct the suspended matter to the skim collection channel.

14. The apparatus of claim 9 where the vessel is a cylindrical pressure vessel oriented horizontally.

* * * * *